United States Patent
Toyooka

(10) Patent No.: US 6,504,928 B1
(45) Date of Patent: Jan. 7, 2003

(54) UPPER CLOSURE OF A PORTABLE TELEPHONE AND METHOD OF PRODUCING THE UPPER CLOSURE OF THE PORTABLE TELEPHONE

(75) Inventor: Naoto Toyooka, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/147,940

(22) PCT Filed: Sep. 26, 1997

(86) PCT No.: PCT/JP97/03423

§ 371 (c)(1),
(2), (4) Date: Mar. 24, 1999

(87) PCT Pub. No.: WO98/13980

PCT Pub. Date: Apr. 2, 1998

(30) Foreign Application Priority Data

Sep. 27, 1996 (JP) ............................................... 8-277008

(51) Int. Cl.⁷ ................................................. H04M 1/00
(52) U.S. Cl. ....................................................... 379/433
(58) Field of Search ................................ 379/433, 428, 379/368, 369, 370

(56) References Cited

FOREIGN PATENT DOCUMENTS

| EP | 0 755 767 | | 1/1997 | |
|---|---|---|---|---|
| JP | 57039940 | | 3/1982 | |
| JP | 60-31934 | | 2/1985 | ................. 329/433 |
| JP | 63-31934 | * | 2/1985 | ................. 379/433 |
| JP | 4-50295 | | 4/1992 | |
| JP | 4-138752 | * | 5/1992 | ................. 379/439 |
| JP | 05092529 | | 4/1993 | |
| JP | 06043313 | | 2/1994 | |
| JP | 6-104966 | * | 4/1994 | ................. 379/439 |
| JP | 06106572 | | 4/1994 | |
| JP | 06134804 | | 5/1994 | |
| JP | 06134805 | | 5/1994 | |
| JP | 08052761 | | 2/1996 | |
| JP | 08207494 | | 8/1996 | |
| JP | 08208854 | | 8/1996 | |
| JP | 8-216177 | | 8/1996 | |
| JP | 08216344 | | 8/1996 | |
| JP | 08239507 | | 9/1996 | |

OTHER PUBLICATIONS

Cellstar, Has a new perspective on accessories, Wireless Week, Mar. 1996.*

* cited by examiner

Primary Examiner—Jack Chiang
(74) Attorney, Agent, or Firm—Wenderoth, Lind & Ponack, L.L.P.

(57) ABSTRACT

A cellular phone top cover includes a foil-decorating film (1) including an uppermost layer comprised of a transparent base film (3) and, laminated thereon, a symbol layer (6) for displaying characters or symbols and a colored layer (7) defining a transparent display window (21) of a cellular phone display, and a transparent adhesive layer (15) laminated thereon. The foil-decorating film is bonded via the adhesive layer (15) to a transparent resin molded article (17) of a cellular phone top cover shape having a voice output through-hole (22) and push button through-holes (23), and the foil-decorating film (1) on at least the voice output through-hole (22) has been removed.

20 Claims, 5 Drawing Sheets

UPPER CLOSURE OF A PORTABLE TELEPHONE AND METHOD OF PRODUCING THE UPPER CLOSURE OF THE PORTABLE TELEPHONE

TECHNICAL FIELD

The present invention relates to a cellular phone (portable telephone) top cover having a smaller number of components, high product strength, and high waterproofness, with an arbitrary design given to the top cover, and a method of manufacturing a cellular phone top cover which enables efficient production of a cellular phone top cover having a transparent display window and a character or symbol.

BACKGROUND ART

Conventionally, a cellular phone top cover having a transparent display is constructed by a top cover body component molded of a colored molding resin having a hiding property to prevent any outward leakage of interior display light from an LED and the like, and a transparent display window component fitted in the body component which is molded of a transparent resin so as to allow an interior liquid crystal display to be made visible. The top cover body component has a trade name or the like printed thereon. The transparent display window component is edging-printed with a hiding black ink to provide a liquid crystal display contrast.

However, in prior art cellular phone top covers, the top cover body component and the transparent display component are primarily separate components. Therefore, the cellular phone top cover may be easily disassembled and broken under impact, and is liable to allow entry of water through a crevice. As such, it had no sufficient product strength and no sufficient waterproofing capability.

A prior art method of fabricating a cellular phone top cover requires a number of steps which include molding the top cover body component, printing characters, symbols, and the like on the top cover body component, molding the transparent display component, edge-printing on the transparent display component, and fitting the top cover body component and the transparent display component together. As such, the method requires so much time for fabrication of the cellular phone top cover, and involves issues of frequent defective product occurrences and unsatisfactory production efficiency.

Also, the method requires a number of devices to be prepared including a molding device and a printing device, both for the top cover body component, a molding device and a printing device, both for the transparent display component, and further a device for fitting the top cover body component and the transparent display component together. This necessitates a large capital-investment and production cost.

It is an object of the present invention to provide a cellular phone top cover which has a smaller number of components, satisfactory product strength, and waterproofing characteristic, and has an arbitrary design given to it, and also to provide a method of fabricating a cellular phone top cover which enables efficient production of a cellular phone top cover having a transparent display window and a character or a symbol.

SUMMARY OF THE INVENTION

In order to accomplish the above mentioned objects, the present invention is constructed as follows.

According to a first aspect of the present invention, there is provided a cellular phone (portable telephone) top cover comprising: a foil-decorating film including a character/symbol layer for displaying at least a character or a symbol and a colored layer defining a transparent display window of a cellular phone display which are laminated on an uppermost layer constructed by a transparent base film, and a transparent adhesive layer laminated thereon. The foil-decorating film is bonded via the adhesive layer to a transparent resin molded article of a cellular phone top cover shape having a voice output through-hole and a push button through-hole so that a portion of the colored layer of the foil-decorating film of the transparent resin molded article which is bonded to the article via the transparent adhesive layer defines the transparent display window of the cellular phone display, and at least the foil-decorating film on the voice output through-hole is removed.

According to a second aspect of the present invention, there is provided a cellular phone top cover comprising: a transfer layer including at least a character/symbol layer for displaying a character or a symbol and a colored layer defining a transparent display window of a cellular phone display which are laminated on an uppermost layer constructed by a surface protection layer defined by a transparent ink, and a transparent adhesive layer laminated thereon. The transfer layer is bonded via the transparent adhesive layer to a transparent resin molded article of a cellular phone top cover shape having a voice output through-hole and a push button through-hole so that a portion of the colored layer of the foil-decorating film of the transparent resin molded article which is bonded to the article via the transparent adhesive layer defines the transparent display window of the cellular phone display, and the transfer layer on the voice output through-hole and on the push button through-hole is removed.

According to a third aspect of the present invention, there is provided a cellular phone top cover as set forth in the first or second aspect, wherein the colored layer is constructed by a black colored hiding portion, a first colored hiding portion, and a second colored hiding portion, and wherein the transparent display window is surrounded by any one of the hiding portions.

According to a fourth aspect of the present invention, there is provided a cellular phone top cover as set forth in any one of the first to third aspects, wherein the uppermost layer is resistant to sebum.

According to a fifth aspect of the present invention, there is provided a cellular phone top cover as set forth in any one of the first and fourth aspects, wherein the uppermost layer has a matte surface.

According to a sixth aspect of the present invention, there is provided a cellular phone top cover as set forth in any one of the first to fifth aspects, wherein the uppermost layer has anti-bacterial characteristics.

According to a seventh aspect of the present invention, there is provided a method of fabricating a cellular phone top cover, which comprises several steps discussed below.

A foil-decorating film is brought into intimate contact with an interior surface of a cavity recess of a mold capable of molding a transparent resin into a cellular phone top cover shape having a voice output through-hole and a push button through-hole. The foil-decorating film includes a character/symbol layer for displaying a character or a symbol and a colored layer defining a transparent display window of a cellular phone display which are laminated on a transparent base film, and a transparent adhesive layer laminated thereon.

The mold is then clamped and then the transparent resin is injected. Thus, the foil-decorating film can adhere to a transparent resin molded article so that a portion of the colored layer of the foil-decorating film of the transparent resin molded article which is bonded to the article via the transparent adhesive layer defines the transparent display window of the cellular phone display. At least the foil-decorating film on the voice output through-hole is then removed.

According to an eighth aspect of the present invention, there is provided a method of fabricating a cellular phone top cover, which comprises several steps discussed below.

A foil-decorating film is brought into intimate contact with an interior surface of a cavity recess of a mold capable of molding a transparent resin into a cellular phone top cover shape having a voice output through-hole and a push button through-hole. On the foil-decorating film is formed a transfer layer including at least a surface protective layer formed of a transparent ink, a character and symbol layer for displaying a character or a symbol and a colored layer defining a transparent display window of a cellular phone display, and a transparent adhesive layer, which are sequentially laminated on a transparent base film.

The mold is then clamped and the transparent resin is injected. Thus, the foil-decorating film can adhere to a transparent resin molded article so that a portion of the colored layer of the foil-decorating film of the transparent resin molded article which is bonded to the article via the transparent adhesive layer defines the transparent display window of the cellular phone display. The base film of the foil-decorating film is then released, and the transfer layer on the voice output through-hole and the push button through-hole is removed.

According to a ninth aspect of the present invention, there is provided a method of fabricating a cellular phone top cover as set forth in the seventh or eighth aspect, wherein a thickness of the colored layer of the foil-decorating film is 2 µm–10 µm.

According to a tenth aspect of the present invention, there is provided a cellular phone top cover fabricated in accordance with the method as set forth in any one of the seventh to ninth aspects.

According to the foregoing aspects of the present invention, the cellular phone top cover makes it possible to provide a display, such as liquid crystal display, in the transparent display window, and a speaker or the like in the voice output through-hole, and to provide a push button or the like made of a light permeable resin or the like in the push button through-hole. In combination with a cellular phone back cover, the top cover makes it possible to provide a cellular phone. This type of cellular phone top cover involves a smaller number of components, has high product strength and high waterproofness, and has good design quality with an arbitrary design, such as character, symbol or pattern, given at an arbitrary spot(s).

The method of fabricating a cellular phone top cover of the foregoing aspects of the present invention involves no such fitting process as fitting many components together. Further, any arbitrary design of hiding pattern and the transparent display window can be formed into the resin molded article of an arbitrary configuration in one operation. Also, an arbitrary design can be easily given at an arbitrary spot(s) on the cellular phone top cover. Thus, it is possible to efficiently fabricate such a cellular phone top cover having the transparent display window and character or symbol or pattern as above mentioned.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
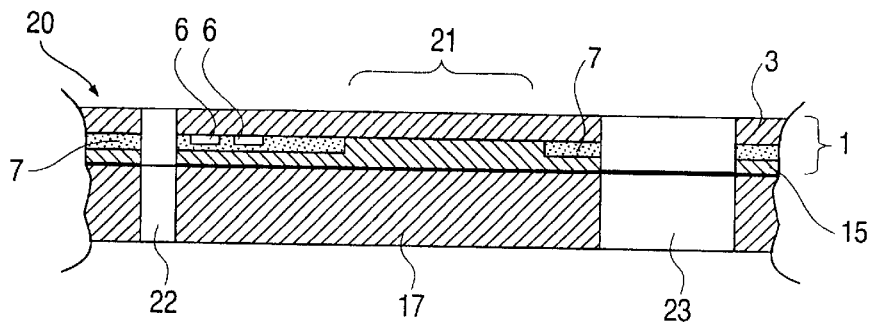
FIG. 1 is a partial sectional view showing a cellular phone top cover according to one embodiment of the invention.

Before the description of the present invention proceeds, it is to be noted that like parts are designated by like reference numerals throughout the accompanying drawings.

The invention will now be described in detail with reference to the drawings.

FIGS. 1, 2, 5, 10A, and 10B are views showing a cellular phone (portable telephone) top cover according to one embodiment of the invention.

The cellular phone top cover of the above mentioned embodiment of the invention comprises a foil-decorating film 1 including on an uppermost layer constructed on a transparent base film 3, symbol layer 6 laminated on base film 3 for displaying at least characters or symbols, a light permeable or hiding colored layer, for example, a hiding layer 7 laminated on base film 3 which defines a transparent display window, and a transparent adhesive layer 15 laminated on the base film 3, the symbol layer 6, and the hiding layer 7. The foil-decorating film is bonded via the adhesive layer 15 to a transparent resin molded article 17 of a cellular phone top cover having a voice output through-hole 22 and push button through-holes 23, and the foil-decorating film 1 on at least the voice output through-hole 22 is removed. If the foil-decorating film 1 on the push button through-holes 23 is not removed, the foil-decorating film 1 on the push button through-holes 23 becomes a part of the uppermost layer for push buttons.

For the transparent base film 3, transparent plastic films, such as polyester resin, polypropylene resin, vinyl chloride resin, polyethylene resin, polyethylene terephthalate resin, polycarbonate resin, nylon resin, vinylon resin, acetate resin, polyethylene resin, polyamide resin, and polyacrylic resin, or polyvinyl chloride resin, are used as such. The transparent base film 3 may have a thickness range of from 5 μm to 300 μm.

If foil-decorating film 1 on the push button through-holes 23 is not removed, the thickness of the transparent base film 3 is 100 μm to 300 μm, and preferably 125 μm.

Since the transparent base film 3 will be brought into direct contact with the human ear, hand, and saliva, use of a sebum-resistant material will result in endurance improvement. When the surface of a portion of the transparent base film 3 which will be brought into direct contact with the human ear is matted by mat finishing, a soft feel to the ear can be obtained. For the transparent base film 3, use of a material having anti-bacterial characteristics can prevent infection by pathogenic fungi or the like and is desirable from a sanitary point of view. In this case, for the transparent base film 3 it is desirable to use a resin film which contains, either in a dispersed state or as a coating, an anti-microbial or antibacterial agent containing the salt of any one of such metals as silver, copper, zinc, and manganese.

The symbol layer 6 may be formed by printing characters, numerics, graphics, symbols, or patterns, including the trade name and maker's name, with inks comprised of pigments of such colors as white and black, and dyes, and a resin binder for presentation on the surface of a cellular phone, a beeper, or the like. The symbol layer 6 may also be formed by printing with black color inorganic pigments having hiding characteristics, such as carbon black and India ink, or metallic pigments, such as pearl pigments. The symbol layer 6 may also be constructed by a thin metal film formed by vacuum deposition, spattering, ion plating, or the like method.

The hiding layer 7 is a layer for occluding the passage of light so as to prevent outward leakage of indicator light from an LED and the like which is mounted inside the cellular phone top cover 20, and defines a transparent display window 21. As an example of the hiding layer 7 other than the one to be described hereinafter, the hiding layer 7 may be a light permeable colored layer formed of a light permeable ink, or a colored layer having a hiding characteristic which is formed of a hiding ink. The transparent display window 21 is a portion which is previous to light so as to enable visual sight of indications from a liquid crystal display or the like mounted inside the cellular phone top cover 20. The transparent display window 21 corresponds to a no-hiding-layer portion on which no hiding layer 7 is laminated. It is possible to arrange the hiding layer 7 so that the ink per se of the hiding layer 7 will appear in the form of character or symbol 16.

It is also possible to arrange the holding layer 7 so that characters or symbols 16 are formed by a no-hiding-layer portion in which no hiding layer 7 is laminated. The hiding layer 7 may include a black color hiding layer 9 formed by printing with a black color hiding ink comprised of a black color inorganic pigment, such as carbon black or India ink, and a resin binder, or a white color, hiding layer 12 formed by printing with a white color hiding ink comprised of a metallic pigment, such as pearl pigment, and a resin binder. The hiding layer 7 may be constructed of a metallic thin film formed by vacuum deposition, spattering, or ion plating.

Figure 2:
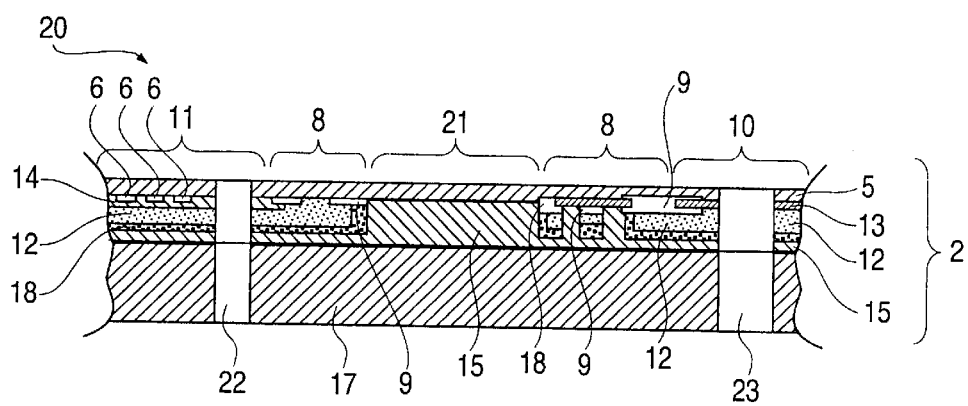
FIG. 2 is a partial sectional view showing the cellular phone top cover according to the first embodiment of the invention.
Figure 5:
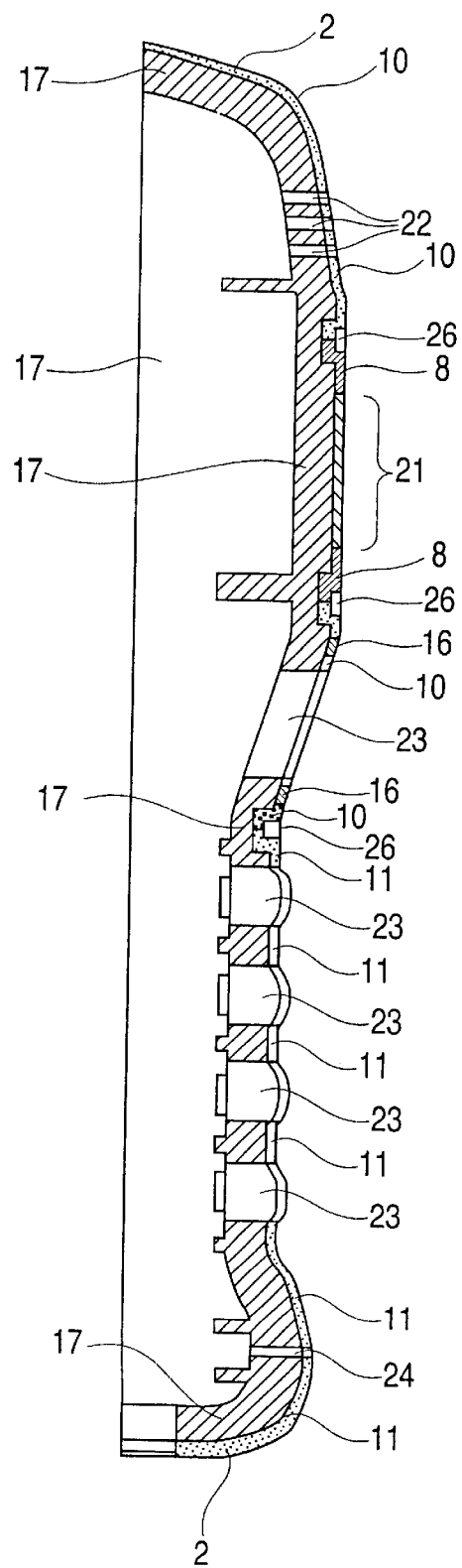
FIG. 5 is a sectional view showing the cellular phone top cover in accordance with the embodiment of the invention.

The hiding layer 7 may be constructed of a black color hiding portion 8, a first color hiding portion 10, and a second color hiding portion 11, and the transparent display window 21 may be defined by being surrounded by either hiding portion 10 or 11 (see FIGS. 2 and 5). In many of the conventional cellular phone top covers, portions other than the transparent display window are of a single color design, say, hiding black color or hiding metallic color, so that the cellular phone top cover is monotonic in design and lacks attractiveness. As in the present embodiment, however, by so arranging the hiding layer 7 so that the cellular phone top cover has the hiding layer 7 segmented into three or more colors, for example, four or five colors, it is possible to enhance attractiveness in design. By arranging the hiding layer 7 so that the first color hiding portion 10 and second color hiding portion 11 are of the same color, it is possible to improve their hiding behavior.

A specific layer arrangement includes a first color layer 13, a black color hiding layer 9, a second color layer 14, a white hiding layer 12, and a transparent adhesive layer 15, sequentially laminated one over another (see FIG. 2). That is, a transparent display window 21 surrounded by the black hiding portion 8 or the white hiding portion is defined by a no-hiding-layer portion in which no black color hiding layer 9 or no white color hiding layer 12 is formed.

The black hiding portion 8 may be formed by patterning the black hiding ink of the black color hiding layer 9. The first color hiding portion 10 may be formed by placing the white color hiding ink and the ink of the first color layer 13 in superposed relation. The second color hiding portion 11 may be formed by placing the white color hiding ink and the ink of the second color layer 14 in superposed relation. The ink of the first color layer 13 and the ink of the second color layer 14 produce colors different from each other. The ink of the first color layer 13 and the ink of the second color layer 14 may be light-permeable. A still further different black color hiding layer 18 may be formed on the white color hiding layer 12. For the colors of the first colored layer 13 and the second colored layer 14, various colors may be used including black, white, blue, green, red, pink, and pastel colors.

Figure 10A:
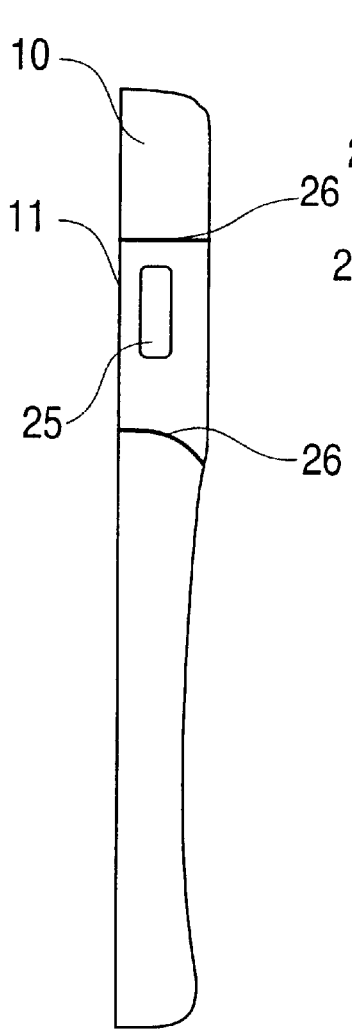
FIGS. 10A and 10B are a front view and a side view showing the cellular phone top cover according to the embodiment of the invention.
Figure 10B:
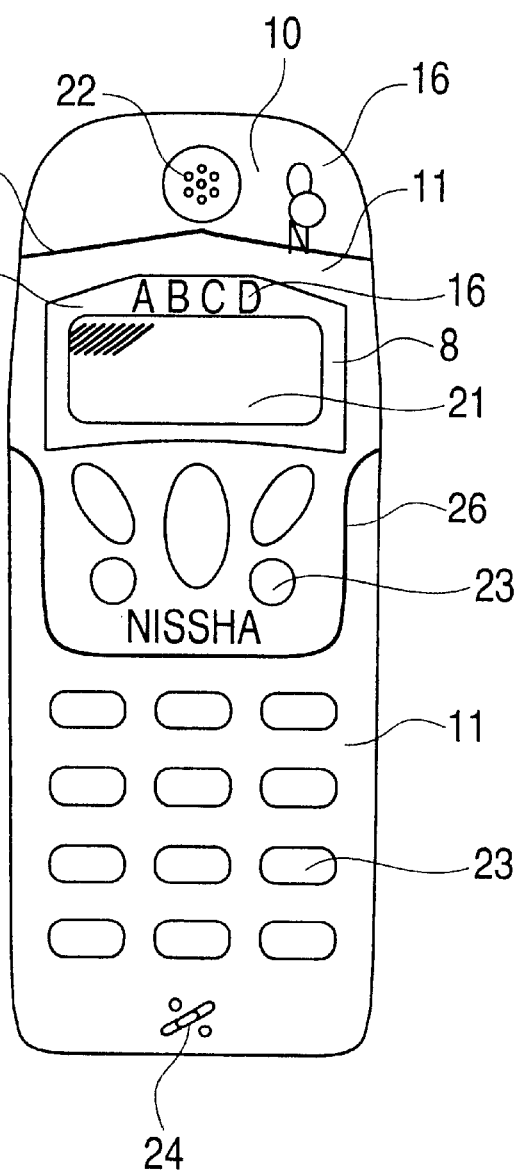

Characters or symbols 16 may be formed by no-hiding-ink portions in which no black-colored hiding ink or no white colored hiding ink is formed. Alternatively, characters or symbols 16 may be formed by ink portions in which a black color hiding ink or white color hiding ink is formed. The characters or symbols 16 formed by such no-hiding-ink portions may be colored by the light-permeable inks of the first color layer 13 and of the second color layer 14, or may be colored by a black color hiding ink or white color hiding ink. Thus, colored light-emitting characters or symbols 16, or white color hiding characters or symbols 16 are defined by being surrounded by the black or white color hiding portion. By arranging the hiding portions so that the boundary between the black color hiding portion 8 and the first color hiding portion 10 of the foil-decorating film, or the boundary between the black color hiding portion 8 and the second color hiding portion 11 thereof, or the boundary between the first color hiding portion 10 and the second color hiding portion 11 thereof is positioned in a recessed portion 26 of a transparent resin molded article 17, it is possible to obtain a product without any noticeable border line waviness, color deviation or the like which can enhance its appearance (FIGS. 5 and 10A). The recessed portion 26 may be such that it is formed by a linear or annular groove (FIG. 10B). Alternatively, the recessed portion 26 may be defined by a stepped portion.

The transparent adhesive layer 15 is a layer which will adhere to the surface of the transparent resin molded article 17, formed by cooling and then solidifying an injected transparent resin 39 to be described hereinafter. In case the transparent adhesive layer 15 is caused to adhere to the surface of the transparent resin molded article 17 simultaneously with the molding operation of the transparent resin molded article 17, a polyacrylic resin may be used for the transparent layer 15. In case the transparent resin molded article 17 is formed with polyphenylene oxide/polystyrene resin, polycarbonate resin, styrene copolymer resin, or polystyrene blended resin, a resin having affinity for these resins, such as polyacrylic resin, polystyrene resin, or polyamide resin, may be used as the transparent adhesive layer 15. For forming the transparent adhesive layer 15, a coating method such as the gravure coating method, the roll coating method, or the comma coat method, or a printing method such as the gravure printing method or the screen printing method may be used. The dry film thickness of the transparent adhesive layer 15 is generally 1 μm to 5 μm.

The decorative layer may be laminated between the symbol layer 6 and the hiding layer 7. The decorative layer is a layer for providing the cellular phone with a pattern and colors. Various patterns exist including a wood grain pattern, a fake fur pattern such as a leopard fur pattern, or an abstract pattern such as marble tone.

The transparent resin molded article 17 has a cellular phone top cover configuration with the voice output through-hole 22 and the push-button through-holes 23. The transparent resin molded article 17 is such that the injected transparent resin 39 to be described hereinafter is cooled, solidified, and molded into shape. It is desirable that the voice output through-hole 22 is positioned in an upper portion of the transparent resin molded article 17 since the voice output through-hole 22 is to be brought close to or into contact with the user's ear. The push-button through-hole 23 is desirably located in a lower half portion of the transparent resin molded article 17 so as to enable the user to push buttons with the thumb as he or she holds the phone in hand. A voice input through-hole 24 may be formed beneath the push-button through-hole 23. The reason for this is that the voice input through-hole 24 is a portion which is to be brought closer to the mouth of the user. On the surface of the transparent resin molded article 17 at a location adjacent to the position for the voice input through-hole 24 and at a location adjacent to the position for the voice output through-hole 22, there may be a raised portion(s) relative to the position for the push-button through-hole 23. The transparent resin molded article 17 may have a side through-hole 25 for a switch, a dial, and a tuner at a raised portion or at a side portion (FIG. 10A).

The adhesion of the foil-decorating film 1 to the transparent resin molded article 17 may mean the state of adhesion effected with an adhesive via. The transparent adhesive layer 15. Alternatively, the adhesion may mean that when the transparent resin 39 to be converted into the transparent resin molded article 17 is in a molten state, the transparent adhesive layer 15 of the foil-decorating film 1 is brought into contact with the transparent resin 39 in the molten state, and is cooled and solidified while being kept in such contact. Simultaneously, the transparent resin layer of the foil-decorating film 1 is inseparably fixed to the transparent resin molded article 17 through sticking or fusion bond.

The cellular phone top cover of the present embodiment may be such that the foil-decorating film 1 is caused to adhere to the transparent resin molded article 17 so that the transparent base film 3 does not peel off. The cover may also be such that the foil-decorating film 1, in the form of a so-called transfer layer 2, is caused to adhere to the transparent resin component 17, and such that the base film 4 is made to peel off, with the transfer layer 2 alone kept in adhesion to the transparent resin molded article 17 (FIG. 5).

In the former case, the transparent base film is relatively thick as compared with the transfer layer and has a comparatively high rigidity. Therefore, on the push-button through-hole 23, the transparent base film 3 can be caused to function as a finger contact sheet which is a component of a membrane switch. Also, it is possible to form a continuous pattern on the push-button surface and the surface of the cellular phone top cover in such a way that the pattern of the top cover will not be interrupted at the location of the push-button through-holes 23.

In the latter case, the arrangement is such that on an uppermost layer constructed by the surface protective layer 5 defined by a transparent ink, there are laminated at least symbol layer 6 and the hiding layer 7 defining the transparent display window 21 and the transparent adhesive layer 15 laminated thereon to form a transfer layer 2. The transfer layer 2 is bonded via the transparent adhesive layer 15 to the transparent resin molded article 17 of the cellular phone top cover shape having the voice output through-hole 22 and the push button through-holes 23. The transfer layer 2 on at least the voice output through-hole 22 and on the push-button through-holes 23 is removed (FIG. 2). The transfer layer 2 may have a decorative layer.

The surface protective layer 5 is formed of a transparent ink. The surface protective layer 5 is intended to be peeled off between the base film 4 and the transfer layer after the transparent adhesive layer 15 adheres to the transparent resin molded-article 17. The surface protective layer 5 may be formed by printing or the like using a thermoplastic resin, natural rubber, a synthetic rubber, or the like. Materials usable for the surface protective layer 5 are polyacrylic resins. In case that hardness is required with respect to the surface protective layer 5, an ionizing radiation setting resin such as ultraviolet setting resin may be used. The ionizing radiation setting resin may be used singly or in mixture with other resins. Since the surface protective layer 5 will be brought into direct contact with the human ear, hand, and saliva, use of a sebum resistant material for the surface protective layer 5 will result in endurance improvement. When the surface of a portion of the surface protective layer 5 which will be brought into direct contact with the human ear is matted by mat finishing, a soft feel to the ear can be obtained. For the surface protective layer 5, use of a material having anti-bacterial characteristics can prevent infection by pathogenic bacteria fungi or the like and is desirable from a sanitary point of view. In this case, it is desirable that the surface protective layer 5 is formed by coating or printing using a synthetic resin ink which contains in a dispersed state an anti-microbial or antibacterial agent containing the salt of any one of such metals as silver, copper, zinc, and manganese.

Next, a method of fabricating the cellular phone top cover according to one embodiment of the invention will be described (FIGS. 6 to 11).

The method of fabricating the cellular phone top cover in the present embodiment comprises bringing the foil-decorating film 1 into intimate contact with the surface of the cavity recess 32 of a mold capable of forming a transparent resin molded article into the cellular phone top cover shape having the voice output through-hole 22 and the push button through-holes 23. The foil-decorating film 1 includes the transparent base film 3, the symbol layer 6 and the hiding layer 7 defining the transparent display window 21 laminated on the base film 4, and the transparent adhesive layer 15 laminated thereon. The mold is clamped and then the molten transparent resin 39 is injected thereinto, thereby enabling the foil-decorating film 1 to adhere to the transparent resin molded article 17. The foil-decorating film 1 on at least the voice output through-hole 22 is then removed.

The method of fabricating the cellular phone top cover is described in detail below.

First, the foil-decorating film 1, the injection mold, and an injection device are prepared.

Figure 3:
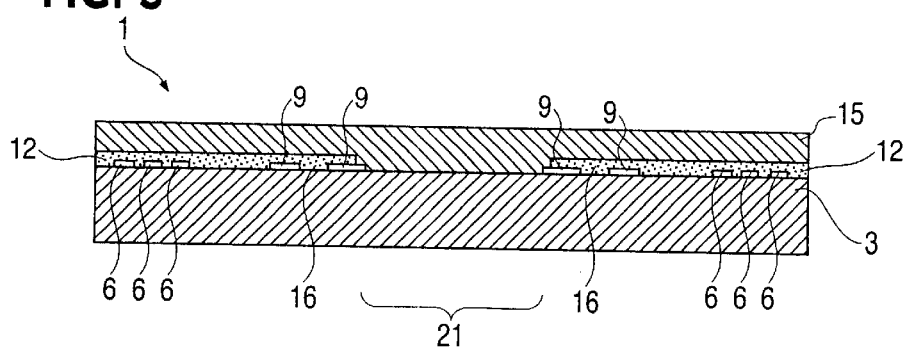
FIG. 3 is a sectional view showing a foil-decorating film for use in a method of manufacturing a cellular phone top cover according to one embodiment of the invention.

The foil-decorating film 1 comprises at least the symbol layer 6 and the hiding layer 7 defining the transparent display window 21, both of which are laminated on the transparent base film 3, and laminated further thereon is the transparent adhesive layer 15 (FIG. 3). The foil-decorating film 1 may also be such that on a base film 4 there are formed at least the surface protective layer 5 defined by a transparent ink, the symbol layer 6, the hiding layer 7 defining the transparent display window 21, and the transparent adhesive layer 15 sequentially laminated to form the transfer layer 2 (FIG. 4).

Materials of the transparent base film 3, the base film 4, the symbol layer 6, the hiding layer 7, the transparent adhesive layer 15 and/or the decorative layer are the same as those of the cellular phone top cover of the embodiment already described. The thickness of the hiding layer 7 of the foil-decorating film 1 may be 2 µm to 10 µm in order to avoid cracking or crazing which may otherwise occur when the foil-decorating film 1 is substantially extended.

The hiding layer 7 of the foil-decorating film 1 is constructed of the black color hiding portion 8, the first color hiding portion 10, and the second color hiding portion 11, and the transparent display window 21 may be formed by being surrounded by one of the hiding portions.

Figure 4:
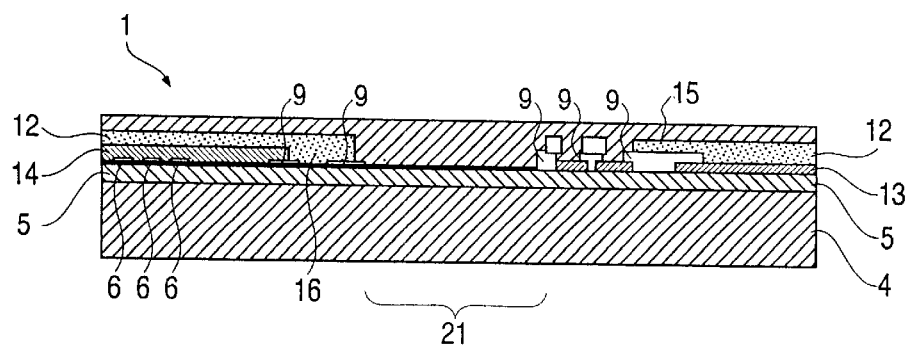
FIG. 4 is a sectional view showing a foil-decorating film for use in the method of manufacturing the cellular phone top cover according to the embodiment of the invention.

A specific layer arrangement includes the surface protective layer 5, the symbol layer 6, the first color layer 13, the black hiding layer 9, the second color layer 14, the white hiding layer 12, and the transparent adhesive layer 15 which are sequentially laminated on the base film 4 (FIG. 4). That is, the transparent display window 21 surrounded by the black hiding portion 8 and the white hiding portion 12 is defined as a no-hiding-layer portion in which no black hiding layer 9 or no white hiding layer 12 is formed. Materials for the base film 4, the surface protective layer 5, the symbol layer 6, and the transparent adhesive layer 15 are the same as those of the cellular phone top cover of the embodiment described above.

The black color hiding portion 8 may be formed by patterning the black hiding ink of the black color hiding layer 9. The first color hiding portion 10 may be formed by placing the white hiding ink and the ink of the first color layer 13 in superposed relation. The second color hiding portion 11 may be formed by placing the white color hiding ink and the ink of the second color layer 14 in superposed relation. The ink of the first colored layer 13 and the ink of the second color layer 14 produce colors that are different from each other. The ink of the first color layer 13 and the ink of the second color layer 14 may be light permeable. Characters or symbols 16 may be formed by no-hiding-ink portions in which no black color hiding ink or no white color hiding ink is formed. Alternatively, characters or symbols 16 may be formed by ink portions in which a black color hiding ink or white color hiding ink is formed. The characters or symbols 16 formed by such no-hiding-ink portions may be colored by the light-permeable inks of the first color layer 13 and of the second color layer 14, or may be colored by a black color hiding ink or white color hiding ink. Thus, colored light-emitting characters or symbols 16, or white color hiding characters or symbols 16 are defined by being surrounded by the black or white color hiding portion.

The mold is one such that the mold can form a transparent resin into the cellular phone top cover shape having the voice output through-hole 22 and the push-button through-holes 23 (FIGS. 6 to 9). The mold is constructed by a movable mold 30 and a stationary mold 31. The movable mold 30 has the cavity recess 32 into which the transparent resin 39 is injected, and the stationary mold 31 has an injection port 33 positioned in opposed relation to the cavity recess 32 and connected directly to an injection nozzle of the injection device. The movable mold 30 may have slide cores 34 for forming the voice output through-hole 22 and the push-button through-holes 23 in the molded article. The slide core 34 may be rod-shaped, or annular or cylindrical. The movable mold 30 may have a convex portion 40 for forming the recessed portion 26 in the molded article. The movable mold 30 may, on a parting plane, have a clamp member 35 for pressing the foil-decorating film 1 around the peripheral edge of the cavity recess 32. The cavity recess 32 of the movable mold 30 may be formed with suction holes 36 for causing the foil-decorating film 1 to go into close contact with the interior surface of the cavity recess 32.

The mold may be provided with a feeder of foil decorating film 1 for feeding the foil-decorating film 1 to the front of the cavity recess 32. The foil-decorating film feeder may be provided on either the movable mold-30-side or the stationary mold-31-side. The foil-decorating film feeder is constructed by a feed device 37 and a take-up device 38. The feed device 37 may be mounted above the movable mold 30 or below the stationary mold 31. The take-up device 38 may be mounted below the movable mold 30 or below the stationary mold 31. Also, the foil-decorating film feeder may be constructed of the feeder device 37 and a film introduction means so that a cut end of the foil-decorating film 1 is grasped and pulled into a space between the movable mold 30 and the stationary mold 31.

Figure 6:
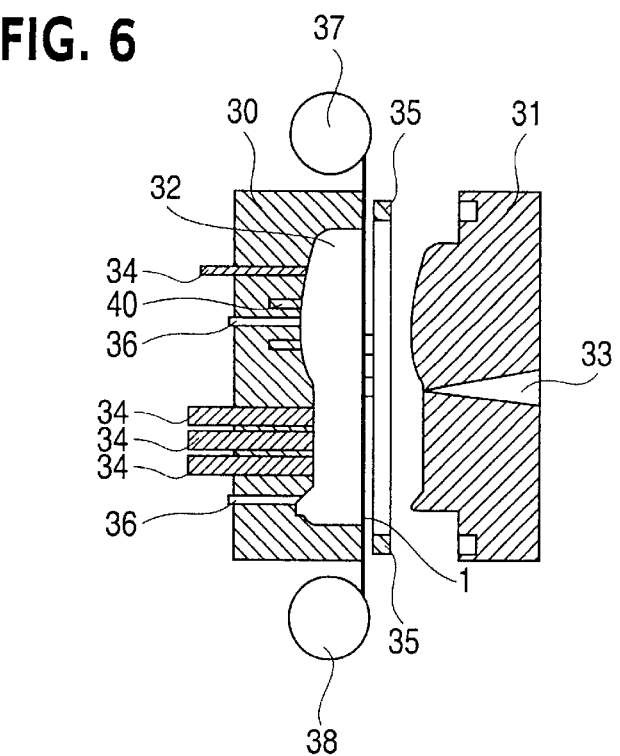
FIG. 6 is a sectional view showing one of the manufacturing processes in the method of manufacturing the cellular phone top cover according to the embodiment of the invention.
Figure 7:
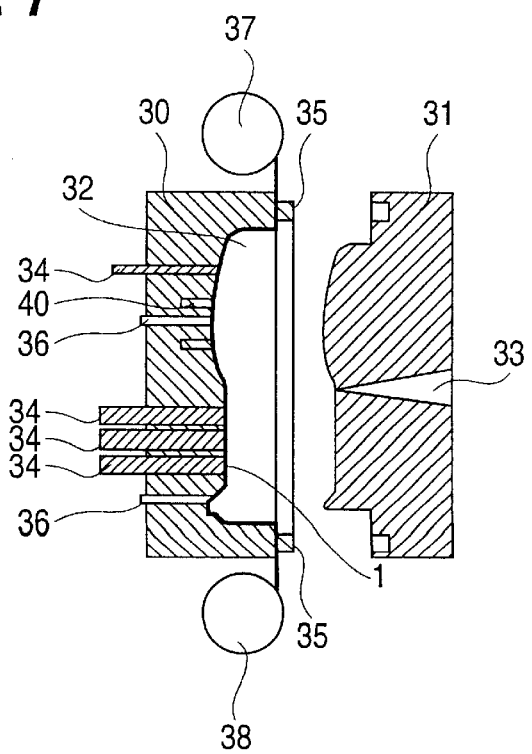
FIG. 7 is a sectional view showing one of the manufacturing processes in the method of manufacturing the cellular phone top cover according to the embodiment of the invention.
Figure 8:
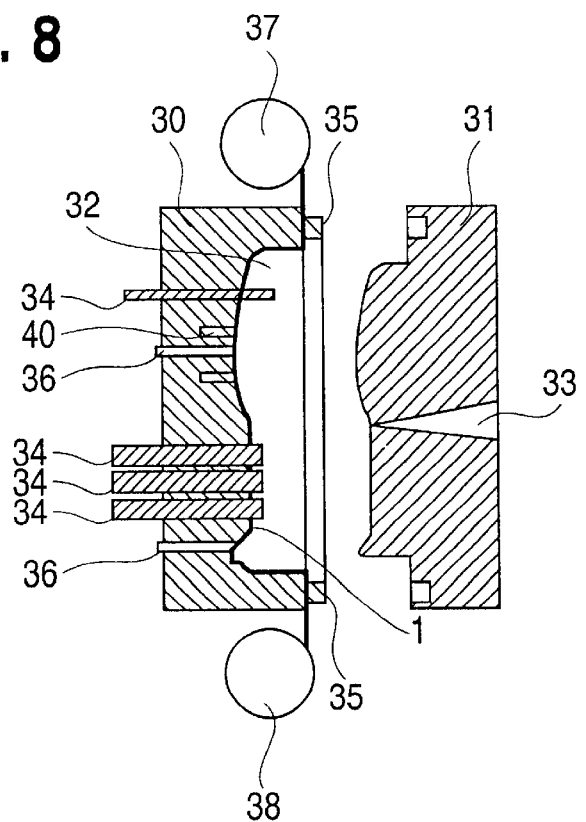
FIG. 8 is a sectional view showing one of the manufacturing processes in the method of manufacturing the cellular phone top cover according to the embodiment of the invention.

First, the foil-decorating film 1 is brought into intimate contact with the interior surface of the cavity recess 32 of a mold capable of forming the transparent resin molded article 17 having the voice output through-hole 22 and the push-button through-holes 23 into the cellular phone top cover shape (FIGS. 6, 7, and 8).

Specifically, the foil-decorating film 1 is fed into a space between the movable mold 30 and the stationary mold 31 by the foil-decorating film feeder or the like. Next, the characters or symbols 16 of the foil-decorating film 1 are aligned with the cavity recess 32. The boundary between the black color hiding portion 8 of the foil-decorating film 1 and the first color hiding portion 10, and other color boundaries may be aligned with the convex portion 40 of the mold (FIG. 6). Next, the foil-decorating film 1 is sucked through the suction holes 36 of the movable mold 30 and brought into close contact with the interior surface of the cavity recess 32 (FIG. 7). At this point of time, the foil-decorating film 1 may be heated for softening the foil-decorating film 1 to facilitate the extending of the foil-decorating film 1. If the cavity recess 32 has a high-rise defining depth, the hiding layer 7 of the foil-decorating film 1 is made relatively thick, say, 2 µm–10 µm. This is effective because the hiding effect will not be reduced even if the thickness of the hiding layer 7 is reduced as a result of the extending of the foil-decorating film 1. After the foil-decorating film 1 is brought into intimate contact with the inner surface of the cavity recess 32, the slide core 34 of the movable mold 30 may be projected from the cavity recess 32 toward the stationary mold 31 breaking through the foil-decorating film 1 and projecting until the slide core 34 reaches the surface of the stationary mold 31. The projection of the slide core 34 may be carried out before mold clamping or after mold clamping (FIG. 8). Alternatively, the slide core may be projected to a midway point and, after resin filling, may be extended to reach the surface of the stationary mold 31. As another alternative, a slide core (not shown) is provided on the stationary-mold side in corresponding relation to the slide core 34 of the movable mold 30 and, after injection, the two slides are driven forward and backward to cut the foil-decorating film. Feeding may be carried out by feeding a foil-decorating film 1 cut to a specified length into the mold through trimming. Or, a long length of foil-decorating film 1 may be fed into the mold and, during mold closing or clamping, may be cut to a specified configuration.

Figure 9:
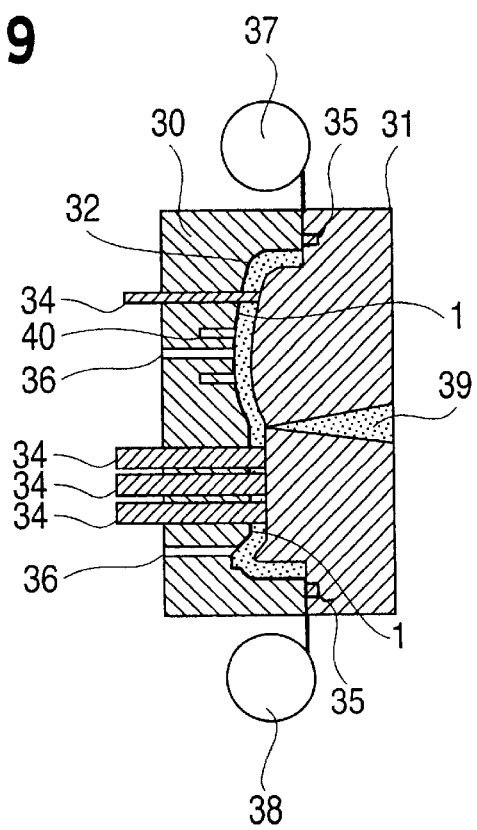
FIG. 9 is a sectional view showing one of the manufacturing processes in the method of manufacturing the cellular phone top cover according to the embodiment of the invention.

Next, the mold is closed and the foil-decorating film 1 is caused to adhere to the transparent resin molded article 17 by injecting the molten transparent resin 39 (FIG. 9). After the molten transparent resin 39 is cooled and solidified, the base film 4 is peeled off where necessary. The foil-decorating film 1 or the transfer layer 2 on the voice output through-hole 22 is also removed.

Specifically, the movable mold 30 and the stationary mold 31 are clamped and the molten transparent resin 39 is injected through the injection port 33 of the stationary mold 31 into the cavity recess 32 so that the cavity recess 32 is filled with the molten transparent resin 39. The molten transparent resin 39 will not go around the projecting portion of the slide core 34 and, therefore, when the injected molten transparent resin 39 is cooled and solidified, the transparent resin molded article 17 is formed with the voice output through-hole 22 and the push-button through-holes 23 (FIGS. 5, and 10B). If the boundary between the black color hiding portion 8 and the first color hiding portion 10 of the foil-decorating film 1 and other color boundaries have been aligned with the slide cores 34 and the projection 40 of the mold, the boundary between the black color hiding portion 8 and the first color hiding portion 10 of the foil-decorating film 1, or other color boundaries are positioned in the recessed portions 26 of the transparent resin molded article 17. This is effective because waving or color boundaries and color deviations become unnoticeable (FIGS. 5, 10A, and 10B).

For the transparent resin 39, injection molding resins, such as acrylic resin, polycarbonate resin, transparent ABS resin, or rubber-contained acrylic resin, are used. A specific example of the rubber-contained acrylic resin is "Acrylpet IR-D50", made by Mitsubishi Rayon K. K.).

If the base film 4 is not peeled off, removal of the foil-decorating film 1 is carried out in such a way that at least the foil-decorating film 1 on the voice output through-hole 22 is removed and, when necessary, the foil-decorating film 1 on the push-button through-holes 23 is also removed. The removed foil-decorating film 1 may be removed from the mold by means of a take-out robot or the like. After the product is removed, the foil-decorating film 1 may be removed. Where the base film 4 is peeled off and the transfer layer 2 is transferred, the foil-decorating film 1 on the voice output through-hole 22 is removed and, when necessary, the transfer layer 2 on the voice output through-hole 22 and on the push-button through-holes 23 is removed.

For removal of unnecessary portions, various methods are usable including the air blow method, the brush scraping method, or suction removal. Alternatively, an adhesive-coated flexible sheet of PET or the like is placed on the voice output through-hole 22 and the push-button through-holes 23 on which unnecessary foil-decorating film 1 or transfer layer 2 remains unremoved, and a rubber or similar resilient material of convex configurations which can fit into the voice output through-hole 22 and the push-button through-holes 23 is pressed against the sheet from above. Thus, unnecessary portions of the foil-decorating film 1 and the transfer layer 2 can be removed through the adhesive force of the flexible sheet.

The configuration of the transparent resin molded article 17 thus obtained can be varied in many ways by changing the configuration of the mold in various ways and, therefore, the configuration of the cellular phone top cover is not limited to the one described above.

The cellular phone top cover 20 fabricated as above described is fitted with a liquid crystal display in the transparent display window 21, and a speaker or the like in the voice output through-hole 22, and push buttons or the like made of a light-permeable resin or the like in the push-button through-holes 23. In combination with a cellular phone back cover, the top cover makes it possible to provide a cellular phone.

The cellular phone top cover of the above described embodiments involves a smaller number of components, has high product strength and high waterproofness, and may have good design quality with an arbitrary design, such as character, symbol or pattern, given at an arbitrary spot.

The method of fabricating a cellular phone top cover of the foregoing embodiment does not require fitting process as fitting many components together. Further, any arbitrary design of the hiding pattern and the transparent display window can be formed into the resin molded article of an arbitrary configuration in one operation. Thus, an arbitrary design can be easily given at an arbitrary spot on the cellular phone top cover. Also, it is possible to efficiently fabricate such a cellular phone top cover having a transparent display window and a character(s) or a symbol(s) or a pattern(s).

The entire disclosure of Japanese Patent Application No. 8-277008 filed on Sep. 27, 1996, including specification, claims, drawings, and summary, are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A cellular phone top cover comprising:
    a foil-decorating film including an uppermost transparent base film layer, a symbol layer for displaying at least one of a character and a symbol, a hiding layer, and a transparent adhesive layer, said symbol layer and said hiding layer being laminated onto said base film layer, and said adhesive layer being laminated onto said base film layer, said symbol layer, and said hiding layer; and
    a transparent resin molded article having a voice output through-hole and a push button through-hole, said foil-decorating film being bonded via said adhesive layer to said resin molded article such that a portion of said hiding layer of said foil-decorating film is arranged to define a transparent display window of the cellular phone top cover, and such that said voice output through-hole is not covered by said foil-decorating film.

2. The cellular phone top cover of claim 1, wherein said transparent resin molded article is formed so as to have a cellular phone top cover shape.

3. The cellular phone top cover of claim 1, wherein said hiding layer comprises a black color hiding layer, a first color hiding layer, and a second color hiding layer, wherein said transparent display window is surrounded by at least one of said black color hiding layer, said first color hiding layer, and said second color hiding layer.

4. The cellular phone top cover of claim 1, wherein said base film layer comprises a sebum-resistant base film layer.

5. The cellular phone top cover of claim 4, wherein said base film layer has a top matted surface.

6. The cellular phone top cover of claim 5, wherein said base film layer comprises an anti-bacterial base film layer.

7. The cellular phone top cover of claim 4, wherein said base film layer comprises an anti-bacterial base film layer.

8. The cellular phone top cover of claim 1, wherein said base film layer has a top matted surface.

9. The cellular phone top cover of claim 8, wherein said base film layer comprises an anti-bacterial base film layer.

10. The cellular phone top cover of claim 1, wherein said base film layer comprises an anti-bacterial base film layer.

11. A cellular phone top cover comprising:
   a transfer layer including an uppermost surface protection layer of transparent ink, a symbol layer for displaying at least one of a character and a symbol, a hiding layer, and a transparent adhesive layer, said symbol layer and said hiding layer being laminated onto said surface protection layer, and said adhesive layer being laminated onto said surface protection layer, said symbol layer, and said hiding layer; and
   a transparent resin molded article having a voice output through-hole and a push button through-hole, said transfer layer being bonded via said adhesive layer to said resin molded article such that a portion of said hiding layer of said transfer layer is arranged to define a transparent display window of the cellular phone top cover, and such that said voice output through-hole and said push button through-hole is not covered by said transfer layer.

12. The cellular phone top cover of claim 11, wherein said transparent resin molded article is formed so as to have a cellular phone top cover shape.

13. The cellular phone top cover of claim 11, wherein said hiding layer comprises a black color hiding layer, a first color hiding layer, and a second color hiding layer, wherein said transparent display window is surrounded by at least one of said black color hiding layer, said first color hiding layer, and said second color hiding layer.

14. The cellular phone top cover of claim 11, wherein said surface protection layer comprises a sebum-resistant surface protection layer.

15. The cellular phone top cover of claim 14, wherein said surface protection layer has a top matted surface.

16. The cellular phone top cover of claim 15, wherein said surface protection layer comprises an anti-bacterial surface protection layer.

17. The cellular phone top cover of claim 14, wherein said surface protection layer comprises an anti-bacterial surface protection layer.

18. The cellular phone top cover of claim 11, wherein said surface protection layer has a top matted surface.

19. The cellular phone top cover of claim 18, wherein said surface protection layer comprises an anti-bacterial surface protection layer.

20. The cellular phone top cover of claim 11, wherein said surface protection layer comprises an anti-bacterial surface protection layer.

* * * * *